Nov. 5, 1929.  A. A. BULL  1,734,794
VINE CUTTER
Filed March 14, 1928   2 Sheets-Sheet 1

Archer A. Bull
INVENTOR
BY Victor J. Evans
ATTORNEY

WITNESS:

Nov. 5, 1929. A. A. BULL 1,734,794
VINE CUTTER
Filed March 14, 1928  2 Sheets-Sheet 2

Archer A. Bull
INVENTOR
BY Victor J. Evans
ATTORNEY

Patented Nov. 5, 1929

1,734,794

UNITED STATES PATENT OFFICE

ARCHER A. BULL, OF NORTH EAST, PENNSYLVANIA, ASSIGNOR OF ONE-HALF TO ORMA J. BENNETT, OF NORTH EAST, PENNSYLVANIA

VINE CUTTER

Application filed March 14, 1928. Serial No. 261,614.

This invention relates to machines for cutting vegetation, an object being to provide a machine which is especially adapted for gathering and cutting the material trimmed from grape vines.

Another object of the invention is the provision of a machine of this character which employs a number of gathering and cutting elements, all arranged and mounted so as to be adjusted as a unit, the structure providing means for mounting the cutters and guiding the material thereby.

With the above and other objects in view, the invention further includes the following novel features and details of construction, to be hereinafter more fully described, illustrated in the accompanying drawings and pointed out in the appended claim.

In the drawings:—

Figure 1:
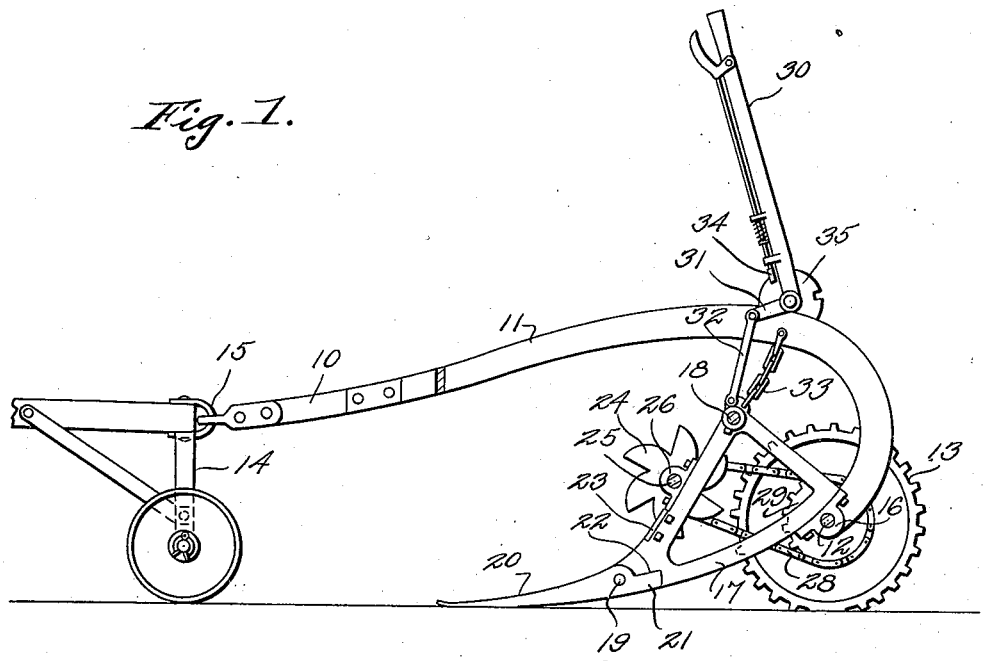
Figure 1 is a sectional view of the invention.
Figure 2:
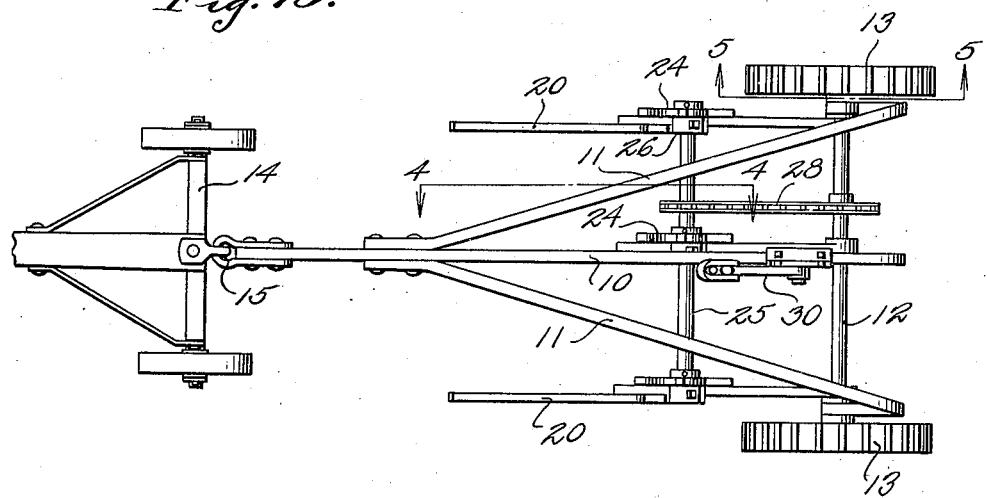
Figure 2 is a top plan view of the same.
Figure 3:
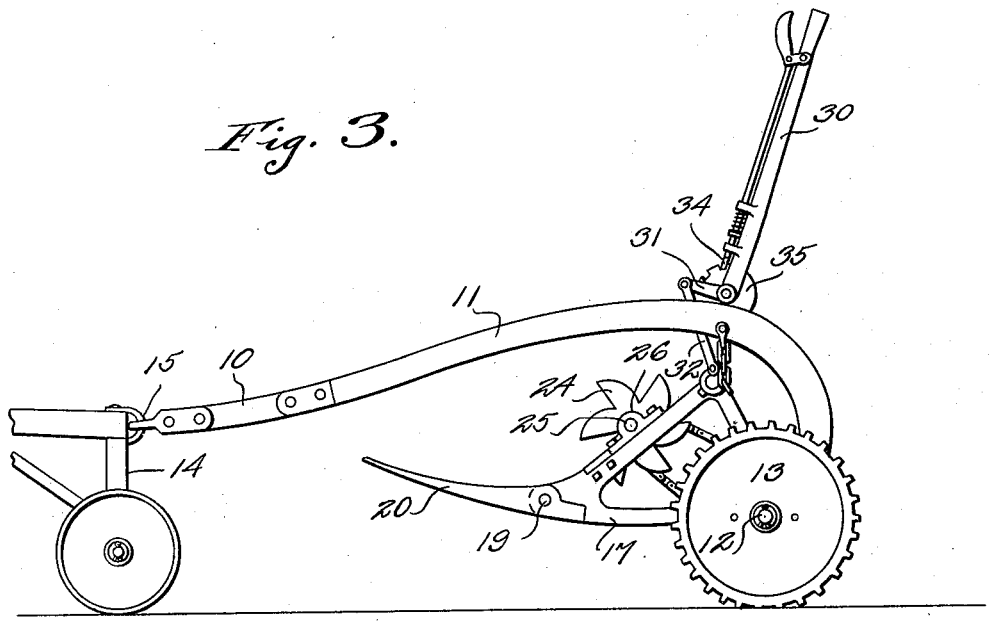
Figure 3 is a side elevation with the auxiliary frames in raised position.
Figures 4, 5:
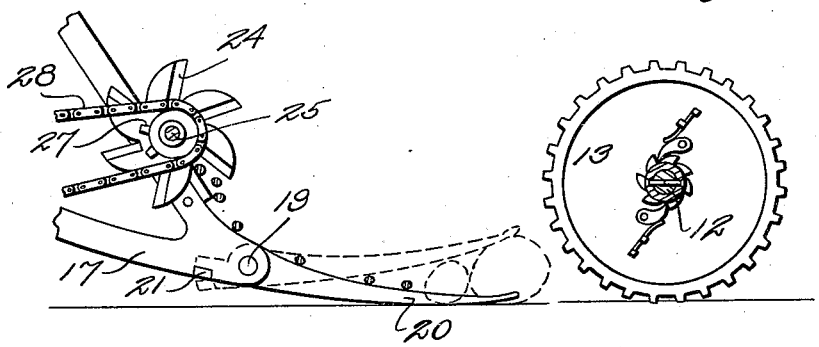

Figures 4 and 5 are fragmentary views taken substantially on the line 4—4 and 5—5 of Figure 2.

Referring to the drawings in detail wherein like characters of reference denote corresponding parts, the machine comprises a main frame which includes a central beam 10 and oppositely divergent side beams 11, the beams 10 and 11 having journaled therein a drive shaft 12, upon which is mounted drive wheels 13. The front ends of the beam 10 are detachably secured to a pony truck 14, or other suitable supporting or draft appliance, the attaching means being indicated at 15.

Pivotally mounted upon the drive shaft 12 as shown at 16 are auxiliary frames 17. These frames are substantially triangular and their upper corners are connected by a combined connecting and spacing bar 18, so that the frames will be held in proper spaced relation.

Pivotally secured to the forward ends of the frame 17 as indicated at 19 are collector fingers 20, the inner ends of these fingers being provided with extensions 21 for engagement with shoulders 22 provided at the forward ends of the frame 17 so as to limit downward pivotal movement of the collector fingers 20. When the frames 17 are moved pivotally upward, these collector fingers will be held against downward pivotal movement, but may move pivotally upward when they engage an obstruction. This is illustrated by the dotted lines in Figure 4 of the drawings.

Secured to the forward edges of the frames 17 are stationary cutters 23. These cutters cooperate with rotary cutters 24 which are mounted upon a shaft 25. The shaft 25 is mounted in bearings 26 which are carried by the frames 17, so that the frames in addition to supporting the fingers 20 also support the cutters, while the shaft 25 of these cutters acts to brace the frames 17.

Secured upon the shaft 25 is a sprocket wheel 27 which is driven by a chain 28 from a sprocket wheel 29 mounted upon the driving axle 12.

Pivotally mounted upon the central beam 10 is an operating lever 30. This lever has rigid therewith an arm 31 which is connected by means of a link 32 with the central frame 17. Through the operation of the lever 30, the frames 17 and the elements carried thereby may be adjusted as a unit. A chain 33 acts to limit downward pivotal movement of this unit. The lever 30 carries a spring actuated dog 34 which is adapted to engage a toothed segment 35 mounted upon the central beam 10.

It will be apparent from the foregoing description and accompanying drawings that the invention provides a machine which when moved over the ground will gather and cut vines or other vegetation, the vines being guided upward by the fingers 20 and the forward portions of the frames 17 until they reach and are acted upon by the cutters 23 and 24. The machine is especially adapted for cutting up into short lengths, the clippings from grape vines and is especially useful in the care of vineyards.

The invention is susceptible of various changes in its form, proportions and minor details of construction and the right is herein reserved to make such changes as properly fall within the scope of the appended claim.

Having described the invention what is claimed is:—

In a machine of the character described, a main wheel supported frame, a driving axle, supplemental frames mounted on said axle for pivotal movement, means connecting the supplemental frames to steady and hold the latter in spaced relation, a shaft mounted in bearings carried by the supplemental frames, rotary cutters mounted on said shaft, stationary cutters mounted on the supplemental frames adjacent to and cooperating with the rotary cuttters, means connecting the cutter carrying shaft and the driving axle to drive said shaft and operate the cutters, and independently movable gathering fingers pivotally secured to and extending from the forward ends of the supplemental frames to gather and guide material to the cuttters.

In testimony whereof I affix my signature.

ARCHER A. BULL.